United States Patent [19]

Graves et al.

[11] 4,137,025
[45] Jan. 30, 1979

[54] APPARATUS FOR MEASURING AND CONTROLLING THE WALL THICKNESS OF PLASTIC PIPES

[76] Inventors: Kenneth E. Graves, 18701 Harleigh Dr., Saratoga, Calif. 95070; Peter Angelbeck, 555 Middlefield Rd., Mountain View, Calif. 94040

[21] Appl. No.: 775,246

[22] Filed: Mar. 7, 1977

[51] Int. Cl.$^2$ ............................................. B29D 23/04
[52] U.S. Cl. ...................................... 425/71; 73/629; 264/40.7; 425/141; 425/325; 425/377; 425/380; 425/404
[58] Field of Search ............... 73/67.8 R, 67.8 S, 67.7, 73/69; 264/40.7, 40.1, 40.5; 425/71, 404, 140, 141, 414, 174.2, 377, 380, 381, 467, 325; 235/151.1, 151.32

[56] References Cited

U.S. PATENT DOCUMENTS

| | | | |
|---|---|---|---|
| 3,546,745 | 12/1970 | Ball | 425/71 |
| 3,558,758 | 1/1971 | Wendt et al. | 425/414 X |
| 3,914,356 | 10/1975 | Dembiak et al. | 425/140 X |
| 4,022,557 | 5/1977 | Johnson | 425/140 X |

FOREIGN PATENT DOCUMENTS 2505221  8/1976  Fed. Rep. of Germany ........... 425/141

*Primary Examiner*—Francis S. Husar
*Assistant Examiner*—Mark Rosenbaum
*Attorney, Agent, or Firm*—Jack M. Wiseman

[57] ABSTRACT

In the manufacture of plastic pipes by the extrusion process, the inside diameter of the pipe and, therefore, the wall thickness of the pipe is controlled by the takeaway speed at which the molten plastic pipe is removed from the sizing sleeve. An ultrasonic transducer is disposed at the upstream end of a sizing sleeve to provide signals representative of the thickness of the molten pipe advancing in the sizing sleeve. These signals are sent to devices for comparing the measured thickness of the molten plastic pipe with the desired thickness of the molten plastic pipe for producing a correction signal. The correction signal is employed for correcting the takeaway speed at which the molten plastic pipe is removed from the sizing sleeve.

16 Claims, 6 Drawing Figures

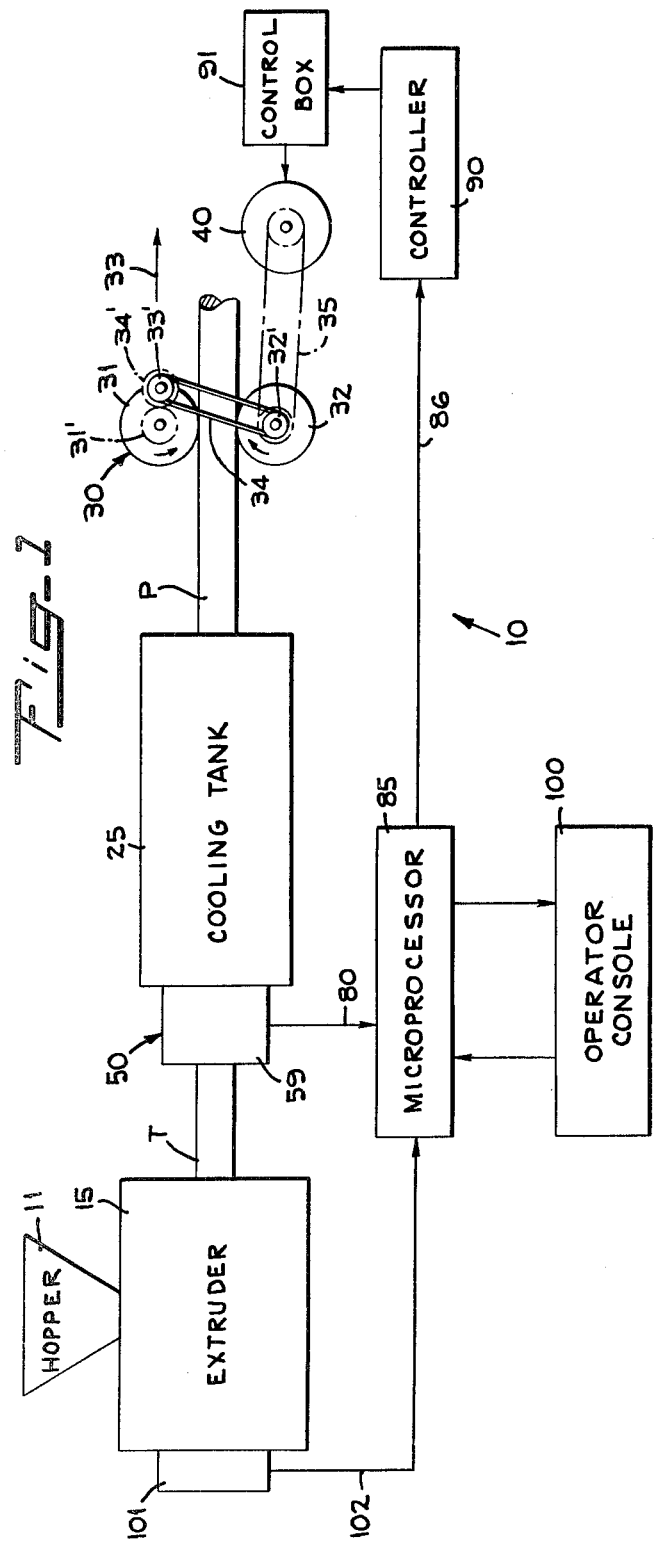
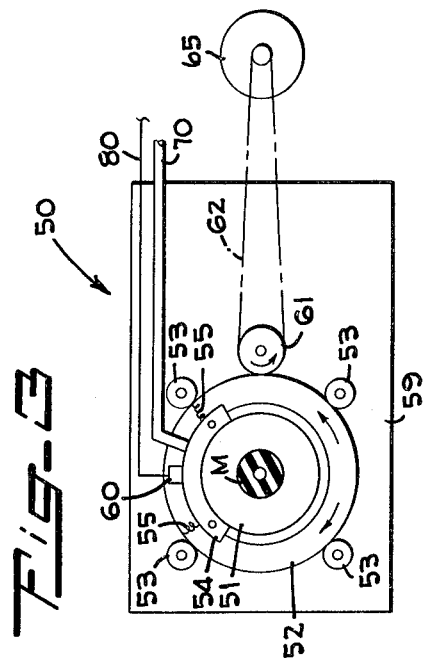
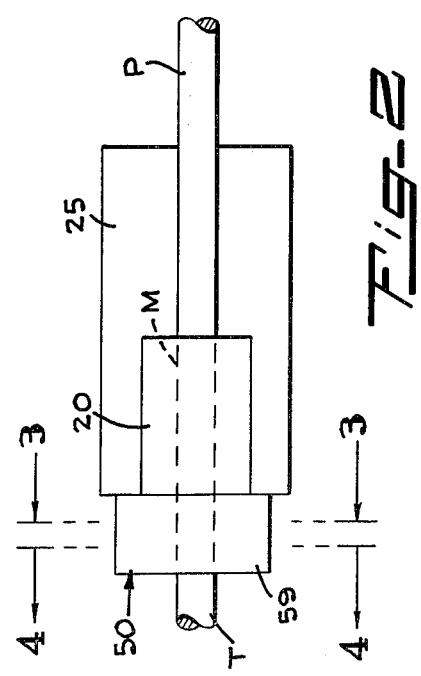

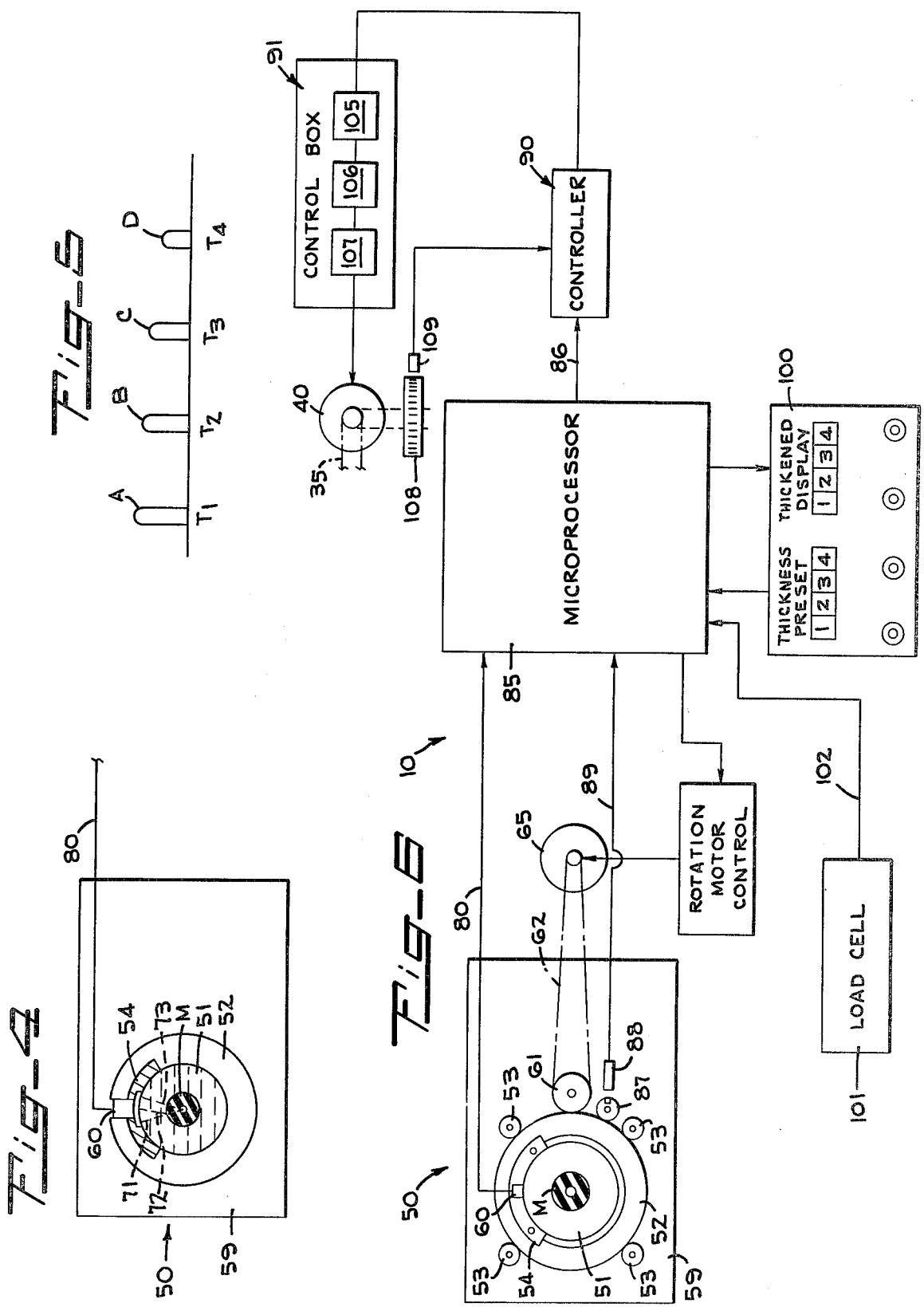

4,137,025

APPARATUS FOR MEASURING AND CONTROLLING THE WALL THICKNESS OF PLASTIC PIPES

BACKGROUND OF THE INVENTION

The present invention relates in general to a method of and apparatus for producing pipes, and more particularly to a method of and apparatus for producing plastic pipes by the extrusion process in which the thickness of the plastic pipe is controlled by the takeaway speed of the molten plastic pipe.

Plastic pipes have been produced by a method commonly referred to as an extrusion process. In the extrusion process, dry raw materials have been placed within a hopper for passage to an extruder. The extruder employed one or more screw type devices which had kneed and compressed the raw material. Heat was applied to the extruder and the combination of the heat and applied pressure turned the raw material into a molten plastic material. At the discharge end of the extruder, the molten plastic material was forced through a die, which formed the molten plastic material into a molten plastic hollow tube.

The molten plastic hollow tube had the approximate dimensions of the desired product. After the molten plastic tube was discharged from the extruder, it was advanced through a sizing sleeve, which was disposed in a cooling tank. The outside diameter of the plastic pipe to be formed therefrom was determined by the inside diameter of the sizing sleeve. As the molten plastic pipe advanced through the sizing sleeve, an external pressure was applied to the inner wall of the molten plastic pipe to urge the outer wall of the molten plastic pipe against the inner wall of the sizing sleeve. The length of the sizing sleeve, which was disposed in the cooling tank, was great enough to allow the skin, outer diameter surface, to cool and thus become rigid while being discharged from the sizing sleeve.

The entire plastic pipe was solidified or made rigid after it was advanced in the cooling tank beyond the sizing sleeve. In the cooling tank were spray heads or chilled water, which had extracted heat from the molten plastic pipe.

The inside diameter of the molten plastic pipe and, therefore, the thickness of the molten plastic pipe was controlled by the speed at which the molten plastic pipe was removed from the sizing sleeve. Thus, it was the takeaway speed at which the molten plastic pipe was removed from the sizing sleeve that had controlled the thickness of the rigid plastic pipe. The faster the rate of withdrawal of the molten plastic pipe from the sizing sleeve, the lesser the thickness of the plastic pipe, since the extruder operated a fixed extrusion rate and the outer diameter of the molten plastic pipe was set by the rigid outer skin thereof being constantly urged against the inner wall of the sizing sleeve.

After the rigid plastic pipe had advanced beyond the cooling tank, it was gripped by takeaway rollers. The speed at which the takeaway rollers were operated controlled the speed at which the molten plastic pipe was removed from the sizing sleeve. A d.c. drive motor controlled the speed at which the takeaway rollers operated. It was a d.c. motor controller, such as a speed control potentiometer driven by a stepping type motor, that was adjusted to regulate the speed at which the d.c. drive motor operated.

Heretofore, the thickness of the plastic pipes produced by the extrusion process depended on the accuracy of the extruder in the rate of feeding the molten plastic tubes to the sizing sleeve, the accuracy of the d.c. drive motor in maintaining a set speed for operating the takeaway rollers, and the frequency at which the thickness of the rigid plastic pipe was inspected.

In order to obtain proper pipe strength, the plastic pipes must meet specific minimum wall thickness. Therefore, manufacturers had a tendency to exceed the minimum wall thickness. This has been a rather costly practice for plastic pipe manufacturers.

Attempts have been made to measure the wall thickness of plastic pipes during the process of manufacturing the same in an effort to reduce manufacturing waste. One measuring device manufactured by Nucleonics used radiation scattering techniques. The equipment was mounted downstream of the cooling tank along the takeaway line. It gave a digital readout of the wall thickness of the plastic pipe. An operator manually adjusted the takeaway speed, based on the digital readout, to regulate the d.c. motor speed and the speed of the takeaway rollers. Other equipment used for measuring the wall thickness of plastic pipes was manufactured by LFE, which was an ultrasonic unit. The ultrasonic unit was mounted in the cooling tank at the downstream end of the sizing sleeve and had a digital readout. The takeaway speed of the plastic pipe was controlled by regulating the speed of the d.c. drive motor through a speed control potentiometer operated through a stepping motor.

In the ultrasonic equipment heretofore employed for measuring the wall thickness of plastic pipes, the ultrasonic transducer sent out pulses through the plastic pipe and detected the reflected pulses. The time interval variations between the transmitted pulses and the detected reflected pulses represented the thickness of the wall of the plastic pipe under test. Such ultrasonic equipment were installed downstream of the sizing sleeve. The transducers of such ultrasonic equipment were not disposed at the upstream end of the sizing sleeve because the plastic was still in a molten state and any engagement therewith resulted in undesirable markings on the finished product. Therefore, the transducers were placed downstream of the sizing sleeve to obviate the undesirable marking on the finished product and also to use the chilled water in the cooling tank to couple the sonic pulses to the plastic pipe to lessen the wear on the transducer resulting from the advancing plastic pipe.

The various systems heretofore employed for measuring and controlling the wall thickness of plastic pipes made by the extrusion process have not been totally satisfactory. Firstly, the adjustment of the takeaway speed was only as good as the ability of the d.c. drive motor to maintain a constant adjusted speed. Secondly, the taking of thickness measurments at the downstream end of the sizing sleeve or a distance downstream from the point of wall thickness generation in the sizing sleeve resulted in a time lag between the generation of the error and the detection and/or correction of the error.

SUMMARY OF THE INVENTION

Apparatus for producing a plastic pipe by the extrusion process in which means are disposed at the upstream end of a sizing sleeve to produce a signal representative of the wall thickness of a molten plastic pipe advancing in the sizing sleeve.

In the exemplary embodiment, a sound transducer is disposed at the upstream end of the sizing sleeve in the vicinity of the generation of the wall thickness for the plastic pipe to produce a signal representative of the thickness of the molten plastic pipe advancing in the sizing sleeve. The signal is sent to a device for comparing the measured thickness of the molten plastic pipe with the desired thickness of the molten plastic pipe to produce a correction signal. The correction signal is employed for correcting the takeaway speed at which the molten plastic pipe is removed from the sizing sleeve.

By virtue of the present invention, the time lag is reduced between the generation of an error in forming the wall thickness of a molten plastic pipe and the detection of the wall thickness of the molten plastic pipe and/or the correction of the wall thickness of the molten plastic pipe. Additionally, the measurement of the wall of the molten plastic pipe is taken before the plastic pipe has reached a state in which it is substantially a rigid plastic pipe, as distinguished from the state in which only its outer skin is relatively rigid.

A feature of the present invention is the automatic regulation of the takeaway speed at which the molten plastic pipe is removed from the sizing sleeve to control the wall thickness thereof automatically for reducing material waste.

A feature of the present invention is the employment of a gauging sleeve between the extruder and the sizing sleeve for the advancement of a hollow plastic tube therebetween and a sonic transducer is placed in contact with the gauging sleeve or is coupled to the gauging sleeve over a water path. The gauging sleeve being of known dimensions facilitates a selfcalibrating system.

DESCRIPTION OF THE DRAWINGS

FIG. 1 is a diagrammatic illustration of apparatus embodying the present invention employed in the extrusion process for the manufacture of plastic pipes.

FIG. 2 is a diagrammatic illustration of a sizing sleeve and a wall thickness measuring device employed in the apparatus shown in FIG. 1 and illustrated with a molten plastic pipe.

FIG. 3 is a diagrammatic vertical sectional view taken along line 3—3 of FIG. 2 to illustrate the measuring device shown in FIGS. 1 and 2.

FIG. 4 is a diagrammatic vertical sectional view taken along line 4—4 of FIG. 2 to illustrate the measuring device shown in FIGS. 1-3.

FIG. 5 is a diagrammatic illustration of ultrasonic pulses transmitted and detected by the measuring device shown in FIGS. 2-4.

FIG. 6 is a block diagram illustrating the measuring device and d.c. motor speed regulating devices used in the apparatus shown in FIG. 1.

DETAILED DESCRIPTION OF THE PREFERRED EMBODIMENTS

Illustrated in FIG. 1 is an apparatus 10 embodying the present invention employed in an extrusion process for the manufacture of plastic pipes. The apparatus 10 comprises a hopper 11 in which is discharged well-known dry raw material for the production of plastic pipes. The hopper 11 discharges the dry raw material into a well-known multiple screw extruder 15. In a well-known manner, the extruder 15 uses one or more screw type devices to kneed and compress the raw material. External heat is applied to the extruder and the combination of heat and pressure converts the dry raw material to a molten material in a well-known manner. At the discharge end of the extruder 15, the molten material is forced through a die which forms the molten material into a hollow tube T in a molten state. The hollow tube T in a molten state has the approximate dimensions of the desired end product.

After the hollow tube T in a molten state is discharged by the extruder 15, it is advanced into a well-known sizing sleeve 20 (FIG. 2) that is disposed in a well-known manner in a conventional cooling tank 25. The inside diameter of the sizing sleeve 20 is dimensioned to the desired outside diameter desired for the finished plastic pipe plus an allowance for shrinkage. The length of the sizing sleeve 20 is dimensioned so that the plastic pipe M discharged therefrom is in a molten state, except for the outside skin thereof which is rigid so that the plastic pipe M discharged by the sizing sleeve 20 will be of a predetermined, preset outside diameter.

The plastic pipe M in a molten state advancing through the sizing sleeve 20 is urged against the inner cylindrical wall of the sizing sleeve 20 by pressurizing the inside of the plastic pipe M in a molten state or by evacuating the cooling tank 25 and allowing atmospheric pressure to force the plastic pipe M in a molten state to be urged against the inner cylindrical wall of the sizing sleeve 20. These practices are well known in the art.

In the cooling tank 25 are chilled water or a series of conventional spray heads (not shown) dispensing chilled water to extract the heat from the plastic pipe advancing therein and to extract heat from the sizing sleeve 20 to rigidify the plastic pipe M in a molten state in a well-known manner. In so doing, a plastic pipe P in a rigid state is removed from the cooling tank 25.

For advancing the plastic pipe from the sizing sleeve 20 and the cooling tank 25, suitable takeaway means 30 (FIG. 1) are provided. As the plastic pipe P is discharged from the cooling tank 25, it is in a rigid state and is gripped by the takeaway means 30. In the exemplary embodiment, the takeaway means 30 comprises rollers or wheels 31 and 32, which grip the plastic pipe P to advance it along a predetermined path in a direction of an arrow 33. A suitable drive motor 40, such as a d.c. drive motor, imparts rotation to the drive belt 35. The drive belt 35, in turn, rotates a sheave 32'. The roller 32 is fixed to a common shaft with the sheave 32' to impart rotation thereto. In turn, the sheave 32' rotates a sheave 33' through a drive belt 34. Fixed to the shaft of the sheave 33' for rotation therewith is a gear 34', which meshes with a gear 31' to impart rotation to the roller 31. The rollers 31 and 32 advance the rigid plastic pipe P in the direction of the arrow 33.

The inside diameter, and thus the wall thickness of the plastic pipe P, is controlled by the speed at which the plastic pipe M in a molten state is removed from the sizing sleeve 20. Since the extruder 15 is discharging the hollow tube T in a molten state at a constant or fixed rate and the outside diameter of the plastic pipe M in a molten state advancing through the sizing sleeve 20 is determined by the inside diameter of the sizing sleeve 20, the inside diameter of the plastic pipe P is detemined by the rate at which the takeaway means 30 removes the plastic pipe M in a molten state from the sizing sleeve 20. Thus, the faster the plastic pipe M in a molten state is removed from the sizing sleeve 20 by the takeaway means 30, the thinner will be the wall thickness of the plastic pipe P.

In the preferred embodiment, the rate at which the takeaway means 30 removes the plastic pipe M in a molten state from the sizing sleeve 20 is controlled by the speed of operation of the d.c. motor 40. A d.c. motor is preferred because its speed can be adjusted with facility.

According to the present invention, the thickness of the plastic pipe is measured while the plastic pipe M is in a molten state for the generation of the inner wall thereof and thereby the correction of the takeaway speed for controlling the thickness of the plastic pipe is made substantially while the plastic pipe M in a molten state is being measured for the wall thickness thereof. Toward this end, a wall thickness measuring device 50 is disposed at the upstream end of the sizing sleeve 20. The wall thickness measuring device 50 can either be part of the sizing sleeve 20 or it can be disposed between the discharge end of the extruder 15 and the sizing sleeve 20. In the preferred embodiment, the wall thickness measuring device 50 may be an ultrasonic or sonic measuring device.

The measuring device 50 comprises a gauging or measuring sleeve 51 (FIGS. 3 and 4) which has its axis coincident with the axis of the sizing sleeve 20. In the preferred embodiment, the sleeve 51 is metallic. The inside diameter of the measuring sleeve 51 is substantially equal to the inside diameter of the sizing sleeve 20. When the measuring sleeve 51 is not integrally formed with the sizing sleeve 20, the confronting ends thereof are preferably contiguous with one another.

As shown in FIGS. 3 and 4, a ring gear 52 surrounds the measuring sleeve 51. The measuring device 50 also includes a housing 59, which in the exemplary embodiment has a rectangular cross-sectional area. The measuring sleeve 51 and the ring gear 52 are disposed within the housing 59. Carried by the housing 59 and disposed therein are rollers 53, which support and journal the ring gear 52 for rotation about the axis or center line of the plastic pipe M in a molten state. Additionally, the ring gear 52 is journalled by the rollers 53 for rotation about the axis of the measuring sleeve 51. Thus, the axis of the ring gear 52, the axis of the measuring sleeve 51 and shoe center line or axis of the plastic pipe M in a molten state are coincident with the ring gear 52 rotating shoe the measuring sleeve 51 and the plastic pipe M in a molten state. shoe shoe Fixed to the ring gear 52 for rotation therewith is an arcuate show 54 (FIG. 3) which is in sliding engagement with the outer wall of the measuring sleeve 51. Springs 55 urge the show 54 in constant engagement with the outer wall of the measuring sleeve 51. Mounted on the show 54 in the housing 59 is a suitable sonic or ultrasonic transducer 60. Ultrasonic transducer of the general type employed herein have been known, such as the Krantkramer-Branson, Inc. of Stanford, Connecticut, Model 303B. It inlcudes the analog circuitry employed in cooperation with the transducer to condition reflected sound pulses, select the proper pulse set and to count the time interval between pulses. The show 54 serves to hold the ultrasonic transducer substantially at a fixed radial distance from the axis of the measuring device 51 and at a position perpendicular to a line tangent to the outer wall of the measuring device 51.

For rotating the ring gear 52, the shoe 54 and the transducer 60 about the axis of the measuring sleeve 51 in an alternate clockwise and counterclockwise direction, a suitable drive gear 61 is disposed in the housing 59 and is arranged to mesh with the ring gear 52 to impart rotation to the ring gear, the shoe 54 and the transducer 60. The drive gear 61 imparts rotation to the ring gear 52 so that the transducer 60 scans over 360° of the measuring sleeve 51 during the clockwise and counterclockwise cycle. Although the transducer 60 alternates in its movement between the clockwise and counterclockwise directions, it still scans the entire angular dimension of 360° of the measuring sleeve 51 during each of the clockwise and counterclockwise cycles. A drive belt 62 interconnects a drive motor 65 with the gear 61 for imparting rotation thereto.

The travel of sound pulses through the air is not as desirable as the travel of sound pulses through water. Thus, water is disposed between the transducer 60 and the measuring sleeve 51. Water is conducted therebetween through a hose 70. The transducer 60 emits a sonic or a supersonic pulse A at a time T1 (FIG. 5) through the water to be transmitted through the measuring sleeve 51 and through the plastic pipe M in a molten state over a path shown in dotted line in FIG. 4 as designated by the reference numeral 71. Sonic energy will be returned to the transducer 60 through water to be detected thereby as pulse B at a time T2 (FIG. 5) over a path shown in dotted line in FIG. 4 as designated by the reference numeral 72, which is sound energy reflected from the inner wall of the gauging sleeve 51 which is in contact with the outer wall of the plastic pipe M in a molten state. Additional sonic energy will be returned to the transducer 60 through water to be detected as pulse C at a time T3 over a path shown in dotted line in FIG. 4 as designated by the reference numeral 73, which is reflected from the inner wall of the plastic pipe M in a molten state. The measuring sleeve 51 is machined to known close tolerances and its sonic properties are known. Hence, the time interval it takes for a sonic pulse to traverse the measuring sleeve 51 is used to calibrate the system to eliminate inaccuracies from temperature and system aging.

The time interval between the emission of the sonic pulse by the transducer 60 and the detection of the reflected sonic pulse from the inner diameter of the plastic pipe M in a molten state is a function of the wall thickness of the plastic pipe M in a molten state, the sonic velocity of the material through which the sound pulse travels, and the temperature. Measurement is taken of the time it takes for sound energy to travel between inner diameter and outer diameter of the gauging sleeve 51. The sonic velocities of plastic pipe are know.

The time interval between T1 and T3 less the time interval between T1 and T2 represents the wall thickness of the plastic pipe M in a molten state substantially at the time of the generation of the inner diameter wall of the plastic pipe.

The thinner the wall thickness of the measuring sleeve 51, the greater the number of sound energy echoes or reflections detected by the transducer 60 before the reflection from the inner diameter of the plastic pipe M in a molten state is detected. This leads to difficulty in deciding which pulse represents the pipe inner diameter pulse. The velocity of sound through steel is in the order of approximately twice the velocity of sound through plastic. Therefore, the measuring sleeve 51, in the preferred embodiment, has a wall thickness at least twice as great as the wall thickness of the plastic pipe M in a molten state so that spurious or false pulses are avoided and the pulse C (FIG. 5) is detected by the transducer 60 before the detection of the pulse D (FIG. 5) by the transducer 60. Thus, the time interval T1–T2 represents the wall thickness of the measuring sleeve 51; the time interval T1 to T3 minus T1 to T2 represents the wall thickness of the plastic pipe M in a molten state; and the time interval T1–T3 represents the combined wall thickness of the measuring sleeve 51 and the plastic pipe M in a molten state. It is desired that the measuring sleeve 51 be dimensioned so that the time of travel of sound energy therethrough be at least twice as great as the time of travel of sound energy through the plastic pipe in a molten state advancing therethrough.

In those systems in which a transducer is placed in contact with the plastic pipe M in the cooling tank, the first echo or reflected sonic pulse will be from the outer diameter of the plastic pipe in a molten state and the second echo from the pipe inner diameter. In such an event, the time interval between the transmitted pulse and the detected pulse represents the thickness of the wall of the plastic pipe P in a semimolten state. However, the readings are inaccurate because the pipe is cooling and in the transition between plastic and solid.

The transducer 60 transmits electrical signals over a conductor 80 representative of the time intervals between emitted pulses and detected pulses to a conventional microprocessor 85. Microprocessors and microcomputers of this general type have been manufactured by Fairchild Semiconductor such as the Model F8, by Motorola such as the Model 6800, by Signetics such as the Model 2650, and by Intel such as the Model 8080A. over transducer In a conventional and well-known manner, the microprocessor 85 is programmed to initiate the operation of the motor 65 (FIGS. 3 and 6) for moving the transducer 60 to scan the measuring sleeve 51. An interrupter wheel 87 engages the ring gear 52 to signal the microprocessor 85 at set intervals around the plastic pipe M in a molten state. This is accomplished in a conventional manner through a detector 88 sensing magnetic interruptions, light interruptions or the like for transmission over a conductor 89. At each interval, the microprocessor 85 takes a thickness reading. The signals transmitted over the conductor 80 are conditioned in the manner aforesaid and stored in the microprocessor 85 as a digital thickness value. when the transducer 60 reaches its starting point, a measurment of the wall thickness of the measuring sleeve 51 is taken and stored in the microprocessor 85 for correlation purposes.

The microprocessor 85 searches through the stored data for the lowest received wall thickness measurment for the plastic pipe P. A comparison is made by the microprocessor 85 between the actual wall thickness and the desired wall thickness after each 360° scanning of the plastic pipe M in a molten state. Should the difference be not tolerable, the microprocessore 85 sends a correction signal over a conductor 86 to a conroller 90. The controller 90 regulates the speed of the d.c. motor 40 through a control box 91 FIGS. 1 and 6). The controller 90 and the control box 91 may be of the type disclosed by the patent to Porter et al. U.S. Pat. No. 3,590,227 issued on June 29, 1971, for Method And Apparatus For Digital Measurement And Control Of A Material Blending Operation. It may also be of the type manufactured by Baron Industrial Electronics as Precision Digital D.C. Motor Controls, Model No. 1103. Also of interest is the patent to Porter et al. U.S. Pat. No. 3,606,903, issued on Sept. 21, 1971, for Method And Apparatus For Producing Isotropic Foamed Stock.

Should a correction be required, the controller 90 receives a correction signal from the microprocessor 85, which is applied to a well-known bi-direct stepper 105 of the controller box 91. The stepper 105 adjusts a well-known ten-turn potentiometer 106 of the controller 91 to further adjust a well-known silicon controlled rectifier controller 107. The spped of the d.c. motor 40 is regulated by the control box 91 through the output signal of the silicon controlled rectifier 107. The shaft of the d.c. motor 40 has a spured gear 108 fixed thereto with magnetically tipped teeth to cause a magnetic pick-up 109 to generate a frequency functionally related to the speed of rotation of the d.c. motor 40.

The controller 90 uses digital counting to regulate the speed of the d.c. motor 40 and output correction signals to keep the d.c. motor 40 at a desired rate of speed. The magnetic pick-up 109 at the shaft of the d.c. motor 40 generates pulses from the teeth of the gear 108 fixed to the shaft of the d.c. motor 40. The number of teeth from the magnetic gear 108 passing the magnetic pick-up 109 over a preset period of time represents the speed of the d.c. motor 40. The pulses are compared by the controller 90 with the desired speed as supplied by the microprocessor 85 and corrections are transmitted to the d.c. motor 40 by way of bi-direct stepper 105, 10-turn potentiometer 106, SCR conroller 107 of the control box 91.

Connected to the microprocessor 85 is an operator's console 100, which includes a start, stop, manual and automatic switches. In the manual mode, an operator can manually set the potentiometer 106 of the control box 91 to control the speed of the d.c. motor 40.

A load cell 101 is disposed in back of the thrust bearing on the extruder screws, not shown, of the extruder 15. The amount of work required to plasticize and extrude the raw material is a function of the material formulation. If the raw material mix, or a change in the composition of one of the mix elements occurs, the change will show as a change in viscosity, and thus the amount of work required to extrude the mix. A change in viscosity will also result in a change in sonic velocity through the plastic in a molten state. By monitoring the load cell 101 through the microprocessor 85 over a conductor 102, an adjustment to the plastic pipe measurements can be effected.

We claim:
1. Apparatus for producing plastic pipe comprising:
  (a) an extruder for forming a hollow plastic tube in a molten state;
  (b) a sizing sleeve disposed downstream of said extruder for receiving the hollow plastic tube in a molten state formed by said extruder to form a plastic pipe in a molten state;
  (c) takeaway means for removing the plastic pipe in a molten state from said sizing sleeve for advancement along a predetermined path downstream of the sizing sleeve;
  (d) cooling means disposed along said predetermined path for forming a plastic pipe in a solid state from said plastic pipe in a molten state;
  (e) measuring means disposed at the upstream end of said sizing sleeve said measuring means comprising a measuring sleeve through which said hollow pipe in a molten state advances, the axis of said measuring sleeve being coincident with the axis of said sizing sleeve, said measuring means further comprising a sonic transducer disposed adjacent to the outer wall of said measuring sleeve for transmitting sound pulses through said measuring sleeve and for detecting sound pulses reflected from the outer diameter of said plastic pipe in a molten state and from the inner diameter of said plastic pipe in a molten state to emit signals representative of the wall thickness of said plastic pipe in a molten state; and (f) control means responsive to said signals emitted by said measuring means for controlling the operation of said takeaway means to adjust the speed at which said takeeaway means removes plastic in a molten state from said sizing sleeve for forming a plastic pipe of a prescribed wall thickness.

2. Apparatus as claimed in claim 1 wherein said control means compares the signals representative of the mesured wall thickness of said plastic pipe in a molten state with signals representative of a desired wall thickness for plastic pipe in a solid state for correcting the speed at which said takeaway means removes plastic pipe in a molten state from said sizing sleeve.

3. Apparatus as claimed in claim 2 wherein said sizing sleeve is disposed in said cooling means and is of sufficient length to enable the plastic pipe in a molten state being removed therefrom to have a rigid skin along the outer wall thereof.

4. Apparatus as claimed in claim 3 wherein said cooling means is arranged for establishing a force in said sizing sleeve to urge the outer wall thereof in engagement with the inner wall of said sizing sleeve prior to the formation of said rigid skin for forming a plastic pipe in a molten state with an outer diameter substantially equal to the inner diameter of said sizing sleeve.

5. Apparatus as claimed in claim 1 wherein the wall thickness of said measuring sleeve is dimensioned so that the time of travel of sound energy therethrough is at least twice as great as the time of travel of sound waves through wall thickness of the plastic pipe in a molten state advancing therethrough.

6. Apparatus as claimed in claim 1 wherein said measuring further comprises a rotatable member on which said transducer is mounted, said rotatable member being journalled for rotation about the axis of said measuring sleeve for scanning the plastic pipe in a molten state advancing through said measuring sleeve.

7. Apparatus as claimed in claim 6 and further comprising means disposed in engagement with said rotatable member for moving said rotatable member about the axis of said measuring sleeve.

8. Apparatus as claimed in claim 1 wherein said control means comprises a microprocessor for receiving said signals emitted by said measuring means for initiating the control operation of said takeaway means to adjust the speed at which said takeaway means removes plastic pipe in a molten state from said sizing sleeve.

9. Apparatus as claimed in claim 2 wherein sid control means comprises a microprocessor for receiving said signals emitted by said measuring means and compares the signals representative of the measured wall thickness of the plastic pipe in a molten state with signals representative of a desired wall thickness for plastic pipe in a solid state to transmit a correction signal for correcting the speed at which said takeaway means removes plastic pipe in a molten state from said sizing sleve.

10. Apparatus as claimed in claim 2 wherein said control means conprises a microprocessor for receiving said signals emitted by said measuring means for initiating the control operation of said takeaway means to adjust the speed at which said takeaway means removes plastic pipe in a molten state from said sizing sleeve.

11. Apparatus as claimed in claim 7 wherein said control means comprises a microprocessor for receiving said signals emitted by said measuring and compares the signals representative of the measured wall thickness of the plastic pipe in a molten state with signals representative of a desired thickness for plastic pipe in a solid state to transmit a correction signal for correcting the speed at which said takeaway means removes plastic pipe in a molten state from said sizing sleeve.

12. Apparatus as claimed in claim 10 wherein said control means further comprises a controller that regulates the speed at which said takeaway means removes plastic pipe in a molten state from said sizing sleeve in response to receiving a correction signal from said microprocessor.

13. Apparatus as claimed in claim 12 wherein said takeaway means includes a device for transmitting a signal to said microprocessor representative of the speed at which said takeaway means removes plastic pipe in a molten state from said sizing sleeve.

14. Apparatus as claimed in claim 11 wherein said microprocessor transmits a signal to said means for moving said rotatable member to control the speed at which said rotatable member moves about the axis of said measuring sleeve.

15. Apparatus as claimed in claim 13 and comprising means on said extruder to emit a signal to said microprocessor representative of change in composition of the hollow plastic tube in a molten state to adjust the wall thickness of the formation of a plastic pipe in a molten state removed from said sizing sleeve.

16. Apparatus as claimed in claim 1 wherein said measuring sleeve is made of a material whose sonic properties are predetermined and the time interval it takes for a sonic pulse to traverse said measuring sleeve is used for calibration to reduce inaccuracies from temperature changes and aging.

* * * * *